(12) United States Patent
Xiao et al.

(10) Patent No.: US 10,475,546 B2
(45) Date of Patent: Nov. 12, 2019

(54) CONDUCTORS COMPRISING A FUNCTIONALIZED ORGANOSILOXANE NETWORK AND METHODS FOR THE PREPARATION THEREOF

(71) Applicant: NATIONAL RESEARCH COUNCIL OF CANADA, Ottawa (CA)

(72) Inventors: Gaozhi George Xiao, Ottawa (CA); Ye Tao, Ottawa (CA); Zhiyi Zhang, Ottawa (CA); Jianping Lu, Ottawa (CA)

(73) Assignee: National Research Council of Canada, Ottawa, Ontario (CA)

( * ) Notice: Subject to any disclaimer, the term of this patent is extended or adjusted under 35 U.S.C. 154(b) by 517 days.

(21) Appl. No.: 14/894,542

(22) PCT Filed: May 28, 2014

(86) PCT No.: PCT/CA2014/000464
§ 371 (c)(1),
(2) Date: Feb. 18, 2016

(87) PCT Pub. No.: WO2014/190417
PCT Pub. Date: Dec. 4, 2014

(65) Prior Publication Data
US 2016/0172068 A1    Jun. 16, 2016

Related U.S. Application Data

(60) Provisional application No. 61/828,903, filed on May 30, 2013.

(51) Int. Cl.
| | | |
|---|---|---|
| *H01B 1/02* | (2006.01) | |
| *C09D 183/04* | (2006.01) | |
| *H01B 1/04* | (2006.01) | |
| *H01B 1/12* | (2006.01) | |
| *C09D 183/08* | (2006.01) | |
| *C08G 77/14* | (2006.01) | |
| *C08G 77/26* | (2006.01) | |
| *C08G 77/38* | (2006.01) | |

(52) U.S. Cl.
CPC ............ *H01B 1/02* (2013.01); *C09D 183/04* (2013.01); *C09D 183/08* (2013.01); *H01B 1/04* (2013.01); *H01B 1/124* (2013.01); *C08G 77/14* (2013.01); *C08G 77/26* (2013.01); *C08G 77/38* (2013.01)

(58) Field of Classification Search
CPC . H01B 1/02; H01B 1/04; H01B 1/124; H01B 1/12
See application file for complete search history.

(56) References Cited

U.S. PATENT DOCUMENTS

| | | | |
|---|---|---|---|
| 3,265,623 A * | 8/1966 | Pines | ........................ C09K 5/20 252/75 |
| 3,749,604 A | 7/1973 | Langer et al. | |
| 4,359,510 A | 11/1982 | Taskier | |
| 4,377,619 A | 3/1983 | Schonhorn et al. | |
| 5,279,910 A | 1/1994 | Sasaki et al. | |
| 5,494,949 A * | 2/1996 | Kinkel | ................... B82Y 30/00 428/405 |
| 6,939,484 B2 | 9/2005 | Dorfman | |
| 2005/0064204 A1* | 3/2005 | Lalli | ...................... B82Y 30/00 428/428 |
| 2008/0054806 A1* | 3/2008 | Alvarez | ................. C09D 5/086 313/582 |
| 2008/0311470 A1 | 12/2008 | Gozdz et al. | |
| 2009/0302280 A1* | 12/2009 | Simone | ................. C07F 7/0854 252/512 |
| 2010/0186992 A1* | 7/2010 | Ogawa | ..................... C09C 1/62 174/126.1 |
| 2011/0117413 A1 | 5/2011 | Wang et al. | |
| 2011/0281024 A1 | 11/2011 | Crumpton et al. | |
| 2014/0031734 A1* | 1/2014 | Saxena | ................ A61K 9/7069 602/48 |

FOREIGN PATENT DOCUMENTS

| | | |
|---|---|---|
| WO | 2006122025 | 11/2006 |
| WO | 2012118829 | 9/2012 |

OTHER PUBLICATIONS

DuPont 5025—Silver Conductor, http://mcmdupont.com, MCM5025 (Jun. 2012).
Gelest, Inc., "Silane Coupling Agents: Connecting Across Boundaries", (Jan. 2006).
Li et al., "Monolayer protection for electrochemical migration control in silver nanocomposite", Applied Physics Letters 89, 112112-1 (Sep. 12, 2006).
Brusic et al., "Corrosion and Protection of a Conductive Silver Paste", J. Electrochem. Soc., vol. 142, No. 8, Aug. 1995, pp. 2591-2594.
Coleman et al., "Silver migration in thick film conductors and chip attachment resins", Microelectronics Journal, vol. 12, No. 4, 1981, pp. 23-29.
Harsanyi et al., "Comparing migratory resistive short formation abilities of conductor systems applied in advanced interconnection systems", Microelectronics Reliability 41 (2001), pp. 229-237.

(Continued)

*Primary Examiner* — Margaret G Moore
(74) *Attorney, Agent, or Firm* — Bereskin & Parr LLP/S.E.N.C.R.L., s.r.l.

(57) ABSTRACT

The present disclosure relates to conductors comprising a conducting member comprising silver and a functionalized organosiloxane network having at least one functional group capable of trapping silver or a silver ion as well as to methods of preparing the same. For example, the functionalized organosiloxane network can at least substantially inhibit dendrite formation between a first conducting member and a second conducting member. For example, the conductors may be used in an electronic circuit such as a printed electronic circuit.

20 Claims, 3 Drawing Sheets

(56) References Cited

OTHER PUBLICATIONS

Lin et al., "On the resistance of silver migration in Ag—Pd conductive thick films under humid environment and applied d.c. field", Materials Chemistry and Physics 43 (1996) pp. 256-265.

* cited by examiner

CONDUCTORS COMPRISING A FUNCTIONALIZED ORGANOSILOXANE NETWORK AND METHODS FOR THE PREPARATION THEREOF

The present application is a 35 USC 371 national stage entry of PCT/CA2014/000464 filed on May 28, 2014 and which claims priority on U.S. 61/828,903 filed on May 30, 2013. These documents are hereby incorporated by reference in their entirety.

The present disclosure relates to conductors. For example, the disclosure relates to a conductor comprising a conducting member comprising silver and a functionalized organosiloxane network having at least one functional group capable of trapping silver or a silver ion as well as to methods for preparing the same. For example, the conductors may be used in an electronic circuit such as a printed electronic circuit.

For silver containing conductors, in the presence of moisture and an electric bias, silver can migrate from one conductor to another and form dendrites between them. Silver migration occurs in four stages, namely:

Stage 1: Formation of a continuous aqueous electrolyte between the neighboring conductors, either on the surface of the insulating substrate or inside the insulating substrate. This step is achieved, for example by the formation of a water (or moisture) film between the conductors and the application of a DC bias between the conductors.

Stage 2: Initiation of silver ions. At the anode, silver dissolves and forms silver ions according to the following equation:

Stage 3: Ion migration. Silver ions migrate from anode to cathode and deposit on the cathode as silver according to the following equation:

Stage 4: Dendritic growth. With the deposition of more and more silver on the cathode, dendrites grow from the cathode towards the anode and eventually cross the gap between the conductors The consequences of this electrochemical migration of silver may be, for example the loss of insulation resistance, or intermittent/permanent shorts. Both cause circuit failures. Facilitators of the formation of electrolytes, such as ionic pollutants from the environment, will accelerate the silver migration. The problem of silver migration has limited the applications of silver-based conductive inks, which are currently the only commercially viable conductive inks, to printable electronics such as printed circuits.

Several techniques have been proposed in the past to address the silver migration issue. For example, alloying silver with palladium has been reported.[1,2,3] This technique has been shown to be effective at addressing the issue but is not suitable for low temperature processing (for example, screen printing or inkjet printing). Palladium is also a very expensive metal. Platinum and tin have also been tried in combination with palladium for this purpose.[3]

Covering the conductors with coatings has also been reported to inhibit silver migration. For example, coatings comprising carbon and dielectrics are known.[4] For example, it has been reported that in a coating between silver conductors comprising one or more inert carbon-based layers and one or more dielectric layers, the carbon prevents the silver from migrating through the dielectric layers. This has been used, for example in Polymer Thick Film (PTF) membrane touch switch fabrications, but the process is a bit complicated and cumbersome. Using a hydrophobic organic polymeric coating such as poly(1H, 1H-pentadecafluorooctyl methacrylate) to prevent the formation of a continuous electrolyte film has also been reported to prevent the silver from migration.[5] Nevertheless, this method appears not to have been used in the industry.

Polymer formulations have also been studied. For example, a fluorocarbon resin such as polyvinylidene fluoride/hexafluoropropylene (PVDF/HFP) has been added to a thick film conductor composition comprising electrically conductive silver powder that was used, for example to make a membrane touch switch (MTS) circuit.[6] Another known approach is adding small molecule carboxylic acids to a nano silver-epoxy adhesive.[7] However, the silver loading in the adhesive studied is about 15% which is much lower than the silver loadings in a typical silver ink which are usually higher than about 50%.

Placing benzotriazole and its derivatives in the environment the conductors are used has also been demonstrated to inhibit silver migration.[8] However, this method only works for sealed applications and is therefore not suitable for general applications.

It would thus be desirable to be provided with a conductor that would at least partially solve one of the problems mentioned or that would be an alternative to the known conductors.

Therefore according to an aspect of the present disclosure, there is provided a conductor, comprising:
 at least one conducting member comprising silver; and
 a functionalized organosiloxane network coating the at least one conducting member, the functionalized organosiloxane network comprising an organosiloxane network and at least one functional group capable of trapping silver or a silver ion.

According to another aspect of the present disclosure, there is provided a conductor, comprising:
 at least one conducting member comprising silver; and
 a functionalized organosiloxane network coating the at least one conducting member, the functionalized organosiloxane network comprising at least one functional group capable of trapping silver or a silver ion, the functionalized organosiloxane network being obtained by reacting at least one organosiloxane network precursor or at least one organosiloxane network with at least one functionalization precursor under conditions to form the functionalized organosiloxane network.

According to another aspect of the present disclosure, there is provided a method for preparing a conductor, comprising:
 coating at least one conducting member comprising silver with a solution comprising at least one functionalization precursor and a solvent;
 optionally heating for a time and at a temperature to at least substantially remove the solvent;
 reacting the at least one functionalization precursor with a solution comprising at least one hydroxylated organosilane; and
 heating for a time and at a temperature to obtain a functionalized organosiloxane network comprising at least one functional group capable of trapping silver or a silver ion.

According to another aspect of the present disclosure, there is provided a method for preparing a conductor, comprising:
coating at least one conducting member comprising silver with a solution comprising at least one hydroxylated organosilane;
heating for a time and at a temperature to obtain an organosiloxane network;
reacting the organosiloxane network with a solution comprising at least one functionalization precursor; and
heating for a time and at a temperature to obtain a functionalized organosiloxane network comprising at least one functional group capable of trapping silver or a silver ion.

According to another aspect of the present disclosure, there is provided a method for preparing a conductor, comprising:
coating at least one conducting member comprising silver with a solution comprising at least one hydroxylated organosilane and a solution comprising at least one functionalization precursor; and
heating for a time and at a temperature to obtain a functionalized organosiloxane network comprising at least one functional group capable of trapping silver or a silver ion.

In the following drawings, which represent by way of example only, various embodiments of the disclosure.

Unless otherwise indicated, the definitions and embodiments described in this and other sections are intended to be applicable to all embodiments and aspects of the present disclosure herein described for which they are suitable as would be understood by a person skilled in the art.

As used in the present disclosure, the singular forms "a", "an" and "the" include plural references unless the content clearly dictates otherwise. For example, an embodiment including "a functionalization precursor" should be understood to present certain aspects with one functionalization precursor, or two or more additional functionalization precursors.

In embodiments comprising an "additional" or "second" component, such as an additional or second functionalization precursor, the second component as used herein is different from the other components or first component. A "third" component is different from the other, first, and second components, and further enumerated or "additional" components are similarly different.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

The term "carboxylic acid" as used herein refers to a functional group of the following formula:

The term "thiol" as used herein refers to a functional group of the following formula:

The term "sulfonate" as used herein refers to a functional group of the following formula:

The term "hydroxy" as used herein refers to an —OH group.

The term "amide" as used herein refers to a chemical moiety of the following formula:

The term polyethylene terephthalate as used herein refers to a polymer having the following formula:

The term "alkyl" as used herein, whether it is used alone or as part of another group, means straight or branched chain, saturated alkyl groups. The term $C_{1-6}$alkyl means an alkyl group having 1, 2, 3, 4, 5 or 6 carbon atoms.

The term "alkoxy" as used herein refers to the group —O-alkyl. The term "$C_{1-6}$alkoxy" means an alkoxy group having 1, 2, 3, 4, 5 or 6 carbon atoms bonded to the oxygen atom of the alkoxy group.

The term "alkenyl" as used herein, whether it is used alone or as part of another group, means straight or branched chain, unsaturated alkenyl groups. The term $C_{2-6}$alkenyl means an alkenyl group having 2, 3, 4, 5 or 6 carbon atoms and at least one double bond.

The term "alkenyloxy" as used herein refers to the group —O-alkenyl. The term "$C_{2-6}$alkenyloxy" means an alkenyloxy group having 2, 3, 4, 5 or 6 carbon atoms bonded to the oxygen atom of the alkenyloxy group and at least one double bond.

The term "alkynyl" as used herein, whether it is used alone or as part of another group, means straight or branched chain, unsaturated alkynyl groups. The term $C_{2-6}$alkynyl means an alkynyl group having 2, 3, 4, 5 or 6 carbon atoms and at least one triple bond.

The term "alkynyloxy" as used herein refers to the group —O-alkynyl. The term "$C_{2-6}$alkynyloxy" means an alkynyloxy group having 2, 3, 4, 5 or 6 carbon atoms bonded to the oxygen atom of the alkynyloxy group and at least one triple bond.

The term "aryl" as used herein refers to cyclic groups that contain at least one aromatic ring. For example, the aryl group can contain 6, 9 or 10 atoms such as phenyl, naphthyl or indanyl.

The term "aryloxy" as used herein refers to the group "—O-aryl". For example, the aryl group can contain 6, 9 or 10 atoms such as phenyl, naphthyl or indanyl. For example, the aryl group can be a phenyl.

The term "alkylene" as used herein means straight or branched chain, saturated alkylene group, that is, a saturated carbon chain that contains substituents on two of its ends. The term $C_{1-10}$alkylene means an alkylene group having 1, 2, 3, 4, 5, 6, 7, 8, 9 or 10 carbon atoms.

The term "alkenylene" as used herein means straight or branched chain, unsaturated alkenylene group, that is, an unsaturated carbon chain that contains substituents on two of its ends. The term $C_{2-10}$alkenylene means an alkenylene group having 2, 3, 4, 5, 6, 7, 8, 9 or 10 carbon atoms and at least 1, for example 1-4, 1-3, 1-2 or 1 double bond.

The term "alkynylene" as used herein means straight or branched chain, unsaturated alkynylene group, that is, an unsaturated carbon chain that contains substituents on two of its ends. The term $C_{2-10}$alkynylene means an alkynylene group having 2, 3, 4, 5, 6, 7, 8, 9 or 10 carbon atoms and at least 1, for example 1-4, 1-3, 1-2 or 1 triple bond.

The term "arylene" as used herein means an aryl group that contains substituents on two of its ends. For example, the aryl group can contain 6, 9, 10 or 14 carbons such as benzene, naphthalene, indane or anthracene.

The term "APTMS" as used herein refers to the compound (3-aminopropyl)trimethoxysilane:

The term "1,14-tetradecanedioic acid" as used herein refers to a compound of the following formula:

The term "conducting member" as used herein refers, for example to a solid member which allows for a transfer of electric current. For example, the conducting member can comprise a metal such as but not limited to silver. For example, the conducting member can be a component of a conductor for an electronic circuit such as a printable electronic circuit. For example, the conducting member can be prepared from a silver-based conductive ink. The selection of a suitable silver-based conductive ink and suitable conditions for the preparation of a conducting member therefrom can be made by a person skilled in the art. For example, the conducting member can be prepared from curing a track made from DuPont 5025 silver ink at a temperature of about 120° C. for a time of about 15 minutes.

The expression "functional group capable of trapping silver or a silver ion" as used herein refers, for example to carboxylic acid, a thiol or a sulfonate. For example, a carboxylic acid, when exposed to water, may be in equilibrium between a carboxylic acid form and a carboxylate form that is the conjugate base of the carboxylic acid. The carboxylate may, for example react with a cation such as a silver ion to form an insoluble ionic complex thereby trapping the silver ion. It will be appreciated that there may be an equilibrium between the silver ions ionically complexed to the carboxylate and free silver ions, i.e. —COO$^-$Ag$^+$ ↔ —COO$^-$+Ag$^+$. Accordingly, the term "trapping" as used herein includes ions such as silver ions in such an equilibrium.

The term "organosiloxane network" as used herein refers to a network polymer comprising both siloxane (—Si—O—Si—) moieties and organosilane moieties. The term "organosilane" as used herein refers to a moiety comprising an organic group attached to a silicon atom via a carbon atom by a single bond.

The expression "at least substantially remove the solvent" as used herein refers for example to removing at least about 75, 80, 85, 90, 95, 96, 97, 98, 99, 99.5 or 100% of the solvent.

The expression "until the functionalized organosiloxane network at least substantially coats the surface of the conducting member" as used herein refers for example to coating at least about 50, 75, 80, 90 95, 96, 97, 98, 99, 99.5, 99.9 or 100% of the surface of the conducting member. The term "surface of the conducting member" as used herein refers, for example to that portion of the conducting member which is not covered by a substrate.

The expression "insoluble functionalized organosiloxane network" as used herein means, for example that less than about 2, 1, 0.5, 0.25, 0.1 or about 0% by weight of the functionalized organosiloxane network is soluble in a solvent such as water.

According to an aspect of the present disclosure, there is provided a conductor, comprising:
at least one conducting member comprising silver; and
a functionalized organosiloxane network coating the at least one conducting member, the functionalized organosiloxane network comprising an organosiloxane network and at least one functional group capable of trapping silver or a silver ion.

For example, the at least one functional group can be chosen from a carboxylic acid, a thiol and a sulfonate. For example, the at least one functional group can be a carboxylic acid. For example, the at least one functional group can be a thiol. For example, the at least one functional group can be a sulfonate.

For example, the at least one functional group can be capable of trapping silver.

For example, the at least one functional group can be capable of trapping a silver ion.

For example, the conductor can further comprise a substrate, and the at least one conducting member can be coated on the substrate. For example, the substrate can be an insulating substrate. For example, two common types of substrates are ceramic substrates and polymer substrates. The selection of a suitable substrate will depend, for example on the application and can be made by a person skilled in the art.

For example, the substrate can comprise, consist essentially of or consist of a polymer such as a polyester or a polyimide, a paper, an epoxy glass or a ceramic. For example, the substrate can comprise, consist essentially of or consist of polyethylene terephthalate or a similar polymer. For example, the substrate can comprise polyethylene terephthalate. For example, the substrate can consist essentially of polyethylene terephthalate. For example, the substrate can consist of polyethylene terephthalate. For example, the substrate can comprise, consist essentially of or consist of a ceramic. For example, the substrate can comprise a ceramic. For example, the substrate can consist essentially of a ceramic.

For example, the functionalized organosiloxane network can further comprise at least one linking moiety, and the at least one functional group can be coupled to the organosiloxane network through the at least one linking moiety. For example, the linking moiety can be a divalent organic radical. For example, the linking moiety can be a divalent organic radical comprising an amide.

For example, the functionalized organosiloxane network can be obtained using embodiments of the present disclosure, for example as discussed in greater detail below. A person skilled in the art can choose a suitable method for obtaining a desired functionalized organosiloxane network.

For example, the conductor can have at least two conducting members. For example, the conductor can have two conducting members.

For example, the functionalized organosiloxane network can at least substantially inhibit dendrite formation between a first conducting member and a second conducting member.

For example, the conducting member can further comprise a polymeric binder such as a thermoplastic binder for binding silver particles therein together and/or binding the conducting member to the substrate.

For example, the conductor can be a conductor for a printed electronic circuit.

For example, the functionalized organosiloxane network can be an insoluble functionalized organosiloxane network.

For example, the functionalized organosiloxane network can be a functionalized organosiloxane 3D network.

For example, the functionalized organosiloxane network can be an insoluble functionalized organosiloxane 3D network.

According to another aspect of the present disclosure, there is provided a conductor, comprising:
at least one conducting member comprising silver; and
a functionalized organosiloxane network coating the at least one conducting member, the functionalized organosiloxane network comprising at least one functional group capable of trapping silver or a silver ion, the functionalized organosiloxane network being obtained by reacting at least one organosiloxane network precursor or at least one organosiloxane network with at least one functionalization precursor under conditions to form the functionalized organosiloxane network.

For example, the at least one functional group can be capable of trapping silver.

For example, the at least one functional group can be capable of trapping a silver ion.

For example, the conductor can further comprise a substrate, and the at least one conducting member can be coated on the substrate. For example, the substrate can be an insulating substrate. For example, two common types of substrates are ceramic substrates and polymer substrates. The selection of a suitable substrate will depend, for example on the application and can be made by a person skilled in the art.

For example, the substrate can comprise, consist essentially of or consist of a polymer such as a polyester or a polyimide, a paper, an epoxy glass or a ceramic. For example, the substrate can comprise, consist essentially of or consist of polyethylene terephthalate or a similar polymer. For example, the substrate can comprise polyethylene terephthalate. For example, the substrate can consist essentially of polyethylene terephthalate. For example, the substrate can consist of polyethylene terephthalate. For example, the substrate can comprise, consist essentially of or consist of a ceramic. For example, the substrate can comprise a ceramic. For example, the substrate can consist essentially of a ceramic.

For example, the at least one organosiloxane network precursor can comprise at least one first linking precursor and the at least one functionalization precursor can comprise at least one second linking precursor for reacting with the at least one first linking precursor to form a linking moiety. For example, a first linking precursor can comprise a chemical moiety that can react with a chemical moiety of a second linking precursor to form a linking moiety comprising a covalent bond at the site of the reaction of the chemical moieties of the first and second linking precursors. For example, the first linking precursor can comprise at least one N—H bond and the second linking precursor can comprise at least one —COOH group, and the —COOH group can react with the N—H bond to form a linking moiety comprising an amide group.

For example, the organosiloxane network precursor can be a compound of Formula (I):

wherein $L^1$ can be an organic radical which comprises the at least one first linking precursor, and $R^1$, $R^2$ and $R^3$ can each independently be chosen from hydroxy and a group that is hydrolysable under conditions to form a hydroxylated organosilane.

For example, when a compound of Formula (I) is contacted with water, for example in the presence of an acid, the corresponding hydroxylated organosilane of the Formula (III) can be formed in accordance with the exemplary hydrolysis reaction shown in Scheme 1:

Scheme 1

For example, $R^1$, $R^2$ and $R^3$ can each independently be a group that is hydrolysable under conditions to form a hydroxylated organosilane. For example, a person skilled in the art would readily understand what groups are hydrolysable to form a hydroxylated organosilane and would be able to select conditions for the preparation of the desired hydroxylated organosilane. The selection of a suitable group that is hydrolysable under conditions to form a hydroxylated organosilane may, for example, depend on the reaction rate of such a group. For example, in some examples, a chloro group may react at a rate that is high enough so that it is difficult to control the hydrolysis reaction.

For example, $R^1$, $R^2$ and $R^3$ can each independently be chosen from chloro, $C_{1-6}$alkoxy, $C_{2-6}$alkenyloxy, $C_{2-6}$alkynyloxy, $C_{6-10}$aryloxy and —O—C(O)—$C_{1-6}$alkyl. For example, $R^1$, $R^2$ and $R^3$ can each independently be a $C_{1-6}$alkoxy. For example, $R^1$, $R^2$ and $R^3$ can each be —$OCH_3$ or can each be —$OCH_2CH_3$. For example, $R^1$, $R^2$ and $R^3$ can each be —$OCH_3$.

For example, $L^1$ can have the formula:

wherein
Y can be chosen from $C_{1-10}$alkylene, $C_{2-10}$alkenylene, $C_{2-10}$alkynylene, $C_{6-14}$arylene and —$C_{1-6}$alkylene-$C_{6-14}$arylene-$C_{1-6}$alkylene-; and
$R^4$ can be chosen from H, $C_{1-6}$alkyl, $C_{2-6}$alkenyl, $C_{2-6}$alkynyl and $C_{6-10}$aryl.

For example, Y can be $C_{1-10}$alkylene. For example, Y can be $C_{1-6}$alkylene. For example, Y can be —$(CH_2)_3$—.

For example, $R^4$ can be H or $C_{1-6}$alkyl. For example $R^4$ can be H.

For example, the organosiloxane network precursor can be (3-aminopropyl)trimethoxysilane:

For example, the functionalization precursor can be a compound of Formula (II):

$$L^2—X \quad (II)$$

wherein $L^2$ can be an organic radical which comprises the at least one second linking precursor, and X can be a radical which comprises or consists of the at least one functional group capable of trapping silver or a silver ion.

For example, $L^2$ can be an organic radical which comprises the at least one second linking precursor, and X can be a radical which comprises the at least one functional group capable of trapping silver or a silver ion. For example, $L^2$ can be an organic radical which comprises the at least one second linking precursor and X can be a radical which consists of a functional group capable of trapping a silver ion.

For example, X can comprise a carboxylic acid, a thiol or a sulfonate. For example, X can be chosen from a carboxylic acid, a thiol or a sulfonate. For example, X can be a carboxylic acid. For example, X can be a thiol. For example, X can be a sulfonate.

For example, $L^2$ can comprise at least one group capable of reacting with an N—H bond to form the linking moiety. For example, the at least one group capable of reacting with an N—H bond to form the linking moiety can be a carboxylic acid, and the linking moiety can comprise an amide group.

For example, $L^2$ can have the formula:

wherein A can be absent or can be chosen from $C_{1-20}$alkylene, $C_{2-20}$alkenylene, $C_{2-20}$alkynylene, $C_{6-14}$arylene and —$C_{1-10}$alkylene-$C_{6-14}$arylene-$C_{1-10}$alkylene-.

For example, A can be absent. For example, A can be $C_{1-20}$alkylene. For example, A can be $C_{6-20}$alkylene. For example, A can be $C_{10-14}$alkylene. For example A can be —$(CH_2)_{12}$—.

For example, the functionalization precursor can be 1,14-tetradecanedioic acid:

The conditions to obtain the functionalized organosiloxane network may vary, for example depending on the particular organosiloxane network precursor(s) and/or the particular functionalization precursor(s) used but can be determined by a person skilled in the art. For example, the functionalized organosiloxane network can be obtained from reacting an organosiloxane network with the at least one functionalization precursor, and the organosiloxane network can be obtained by subjecting at least one organosiloxane network precursor to conditions to form the organosiloxane network.

The conditions to form the organosiloxane network may vary, for example depending on the particular organosiloxane network precursor(s) used but can be determined by a person skilled in the art. For example, the conditions to obtain the organosiloxane network can comprise reacting the compound of Formula (I) with water under conditions to form the hydroxylated organosilane and then subjecting the hydroxylated organosilane to condensation conditions.

For example, the hydroxylated organosilane of Formula (III) obtained from the reaction of the organosiloxane network precursor of Formula (I) with water shown in Scheme 1, above can undergo condensation to form, for example, the exemplary organosiloxane network shown in Scheme 2:

It will be appreciated that the exact structure of the organosiloxane network obtained, for example from the reaction shown in Scheme 2 will vary, for example, depending on the conditions used and/or the organosiloxane network precursor used. For example, a person skilled in the art would understand that not all of the hydroxyl groups of the hydroxylated organosilane may participate in a condensation reaction so that the organosiloxane network may comprise variable amounts of silanol (i.e. Si—OH) endgroups.

For example, the conditions to form the hydroxylated organosilane can comprise reacting the compound of Formula (I) with water in the presence of at least one acid. For example, the acid can be hydrochloric acid. For example, about 1 drop of about 37% hydrochloric acid can be added to about 1 gram of a compound of Formula (I) such as (3-aminopropyl)trimethoxysilane dissolved in about 100 grams of distilled water while stirring at room temperature. For example, the conditions to form the hydroxylated organosilane can comprise reacting the compound of Formula (I) with water.

For example, the condensation conditions can comprise coating the at least one conducting member with a solution comprising the hydroxylated organosilane and heating for a time and at a temperature to obtain the organosiloxane network.

The organosiloxane network obtained from the condensation reaction shown in Scheme 2 about can be further reacted with a functionalization precursor. For example, $L^1$ can comprise at least one first linking precursor, and the functionalization precursor can comprise at least one second linking precursor for reacting with the at least one first linking precursor to form a linking moiety. For example, $L^1$ can have the formula:

wherein Y is as defined above. For example, the functionalization precursor can be a compound of Formula (II):

$$L^2—X \qquad (II)$$

wherein X is COOH and $L^2$ has the formula:

wherein A is as defined above. For example, such an organosiloxane network can react with such a functionalization precursor to form the exemplary functionalized organosiloxane network shown in Scheme 3:

It will be appreciated that the exact structure of a functionalized organosiloxane network, for example the functionalized organosiloxane network obtained from the reaction shown in Scheme 3 will depend, for example on the conditions used as well as the particular organosiloxane network and/or the particular functionalization precursor used. For example, a person skilled in the art would understand that, for example, not all of the first linking precursors may react with a second linking precursor to form a linking moiety. For example, in the reaction shown in Scheme 3, not all of the N—H bonds may react with a —COOH group to form a linking moiety comprising an amide group so that the functionalized organosiloxane network obtained may comprise variable amounts of unreacted N—H bonds. A person skilled in the art would also understand that, for example, where a functionalization precursor comprises two carboxylic acid groups, such as the functionalization precursor shown in Scheme 3 above, each of these carboxylic acid groups may react with a separate N—H bond. A person skilled in the art would understand how to select conditions to minimize this from occurring as it would, for example, lead to a lower percentage of functional groups that are capable of trapping a silver ion.

The functionalized organosiloxane network shown in Scheme 3 still comprises carboxylic acid groups that have not reacted with an N—H bond. Such carboxylic acid groups, in an aqueous environment, will exist in equilibrium between the carboxylic acid form and the corresponding carboxylate conjugate base form, depending, for example, on the pH of the aqueous solution. The carboxylate anion may react, for example, with silver ions, trapping them by forming the exemplary structure shown in Scheme 4:

Scheme 4

It will be appreciated that the exact structure of the network, for example that shown in Scheme 4 will depend, for example on the conditions used as well as the particular organosiloxane network precursor used and/or the particular functionalization precursor used and/or the concentration of silver ions. For example, a person skilled in the art would understand that some of the functional groups capable of trapping a silver ion as shown in Scheme 4 will remain in the carboxylic acid form at a given point in time and/or not all of the functional groups capable of trapping a silver ion existing in the carboxylate form may be trapping a silver ion at a particular point in time.

For example, the conditions to form the functionalized organosiloxane network can comprise reacting the organosiloxane network with a solution comprising the compound of Formula (II) and heating for a time and at a temperature to obtain the functionalized organosiloxane network.

For example, the conditions to form the functionalized organosiloxane network can comprise:
 coating the at least one conducting member with a solution comprising the compound of Formula (II) and a solvent;
 optionally heating for a time and at a temperature to at least substantially remove the solvent;
 reacting the compound of Formula (II) with a solution comprising the hydroxylated organosilane; and
 heating for a time and at a temperature to obtain the functionalized organosiloxane network.

For example, the conditions to form the functionalized organosiloxane network can comprise:
 coating the at least one conducting member with a solution comprising the hydroxylated organosilane;
 heating for a time and at a temperature to obtain the organosiloxane network;
 reacting the organosiloxane network with a solution comprising the compound of Formula (II); and
 heating for a time and at a temperature to obtain the functionalized organosiloxane network.

For example, $R^1$, $R^2$ and $R^3$ can each be hydroxy, and the conditions to form the organosiloxane network can comprise subjecting the compound of Formula (I) to condensation conditions.

For example, the condensation conditions can comprise coating the at least one conducting member with a solution comprising the compound of Formula (I) and heating for a time and at a temperature to obtain the organosiloxane network.

For example, the conditions to form the functionalized organosiloxane network can comprise:
 coating the at least one conducting member with a solution comprising the compound of Formula (II) and a solvent;
 optionally heating for a time and at a temperature to at least substantially remove the solvent;
 reacting the compound of Formula (II) with a solution comprising the compound of Formula (I); and
 heating for a time and at a temperature to obtain the functionalized organosiloxane network.

For example, the solvent can comprise, consist essentially of or consist of ethanol or a similar solvent. For example, the solvent can comprise ethanol. For example, the solvent can consist essentially of ethanol. For example, the solvent can consist of ethanol.

For example, the conditions to form the functionalized organosiloxane network can comprise:
 coating the at least one conducting member with a solution comprising the compound of Formula (I);
 heating for a time and at a temperature to obtain the organosiloxane network;
 reacting the organosiloxane network with a solution comprising the compound of Formula (II); and
 heating for a time and at a temperature to obtain the functionalized organosiloxane network.

For example, the conditions to form the functionalized organosiloxane network can comprise:
 coating the at least one conducting member with a solution comprising the hydroxylated organosilane and a solution comprising the compound of Formula (II); and
 heating for a time and at a temperature to obtain the functionalized organosiloxane network.

The conditions will depend, for example on the compounds used to form the functionalized organosiloxane network and can be chosen by a person skilled in the art. For example, the temperature can be from about 80° C. to about 120° C. For example, a suitable temperature for removing water may be about 110° C. For example, the time can be from about 1 seconds to about 5 minutes or about 1 minute.

For example, the at least one conducting member can be heated prior to a first instance of coating the at least one conducting member with a solution comprising the hydroxylated organosilane and a solution comprising the compound of Formula (II).

For example, the conditions to form the functionalized organosiloxane network can be repeated until a functionalized organosiloxane network having a desired thickness is obtained. For example, the conditions can be repeated until the functionalized organosiloxane network at least substantially coats the surface of the conducting member. The selection of suitable conditions will depend, for example on the method and can be determined by a person skilled in the art. For example, it will be appreciated that for dip coating, the conditions may need to be repeated several times so that the functionalized organosiloxane network at least substantially coats the surface of the conducting member. For example, the conditions can be repeated about 0 times to about 10 times, about 2 times to about 8 times, about 3 times to about 5 times or about 8 times. For example, it will be appreciated that for spray coating, the conducting member can be heated to a suitable temperature for removing water, for example about 110° C., a solution comprising at least one organosiloxane network precursor and a solution comprising at least one functionalization precursor can be simultaneously sprayed thereon, and the functionalized organosiloxane network formed in situ without repeating.

For example, the conditions to form the functionalized organosiloxane network can further comprise:

reacting a functionalized organosiloxane network with a solution comprising the compound of Formula (II); and heating for a time and at a temperature to obtain a functionalized organosiloxane network having an increased concentration of a functional group capable of trapping a silver ion.

For example, the organosiloxane network precursor can be (3-aminopropyl)trimethoxysilane and the functionalization precursor can be 1,14-tetradecanedioic acid.

For example, the conductor can have at least two conducting members. For example, the conductor can have two conducting members.

For example, the functionalized organosiloxane network can at least substantially inhibit dendrite formation between a first conducting member and a second conducting member.

For example, the conducting member can further comprise a polymeric binder such as a thermoplastic binder for binding silver particles therein together and/or binding the conducting member to the substrate.

For example, the conductor can be a conductor for a printed electronic circuit.

For example, the functionalized organosiloxane network can be an insoluble functionalized organosiloxane network.

According to another aspect of the present disclosure, there is provided a method for preparing a conductor, comprising:

coating at least one conducting member comprising silver with a solution comprising at least one functionalization precursor and a solvent;

optionally heating for a time and at a temperature to at least substantially remove the solvent;

reacting the at least one functionalization precursor with a solution comprising at least one hydroxylated organosilane; and heating for a time and at a temperature to obtain a functionalized organosiloxane network comprising at least one functional group capable of trapping silver or a silver ion.

According to another aspect of the present disclosure, there is provided a method for preparing a conductor, comprising:

coating at least one conducting member comprising silver with a solution comprising at least one hydroxylated organosilane;

heating for a time and at a temperature to obtain an organosiloxane network;

reacting the organosiloxane network with a solution comprising at least one functionalization precursor; and heating for a time and at a temperature to obtain a functionalized organosiloxane network comprising at least one functional group capable of trapping silver or a silver ion.

According to another aspect of the present disclosure, there is provided a method for preparing a conductor, comprising:

coating at least one conducting member comprising silver with a solution comprising at least one hydroxylated organosilane and a solution comprising at least one functionalization precursor; and heating for a time and at a temperature to obtain a functionalized organosiloxane network comprising at least one functional group capable of trapping silver or a silver ion.

For example, in any of the foregoing methods, an embodiment may be varied as discussed above in relation to a corresponding embodiment for a conductor of the present disclosure.

EXAMPLE 1

Silver conducting tracks formed by screen printing (or other low temperature printing processes) normally have a thin polymer layer at the top in order to bind the silver particles. Due to the existence of free volumes in the polymer structures, the thin layers of polymer coatings are not capable of stopping the penetration of water from the conductor surfaces to reach the silver. Thus silver ions may form in the existence of an electric bias. The electric force may, for example then drive the silver ions to break through the thin polymer layer in the anode and move them to the cathode to form dendrites.

A solution for this may be, for example to apply a thick polymer coating or dense inorganic coating on the conductor surface to block the water penetration and the ion movement. However, such a process may be, for example time consuming and cumbersome.

On the other hand, if a material capable of trapping the silver ions from moving out of the anode is applied, the coating thickness may be reduced and/or the process may be simplified.

Examples of functional groups which can react (or interact) with silver or silver ions, such as a carboxylic group or a thiol group are known. However, most commercially available chemicals containing these functional groups form water-soluble silver chelates, and thus cannot effectively inhibit silver ions from moving under an electric bias. In order to effectively and/or efficiently trap silver ions, a material capable of reacting with silver ions and forming water insoluble compounds would be useful. It would also be useful if this material can be easily applied as a coating on the conducting members.

In the present disclosure, a 3-D cross-linked network structure having functional groups capable of trapping silver ions has been studied as an inhibitor of silver migration in electronic circuits. In particular, a functionalized organosiloxane network has been coated on a plurality of conducting tracks.

Materials

In the following experiments for the preparation of a conductor comprising a functionalized organosiloxane network that inhibits silver migration, the following reagents were used: 99% 1,14-tetradecanedioic acid, Sigma Aldrich; 97% (3-aminopropyl)trimethoxysilane (APTMS), Sigma Aldrich; ethanol, Sigma Aldrich; distilled water; hydrochloric acid (HCl), ACS reagent, 37%, Sigma Aldrich.

Solution Preparation 0.2 g of 1,14-tetradecanedioic acid was added to 10 g ethanol to form a 2 wt. % solution. 1 g of (3-aminopropyl)trimethoxysilane was added to 100 g of distilled water. 1 drop of HCl was added to the solution of (3-aminopropyl)trimethoxysilane in distilled water while stirring at room temperature.

Preparation of Conducting Tracks

Figure 1:
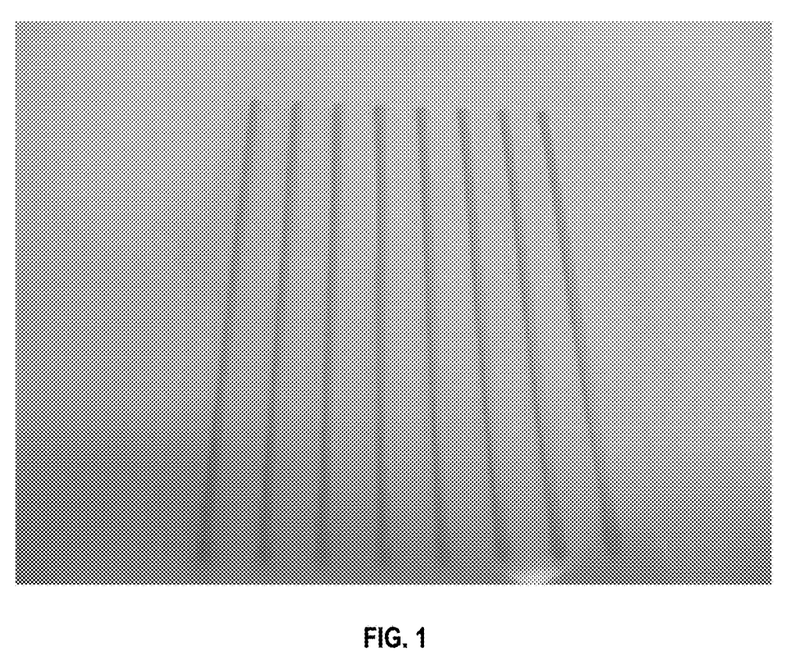
FIG. 1 is a photograph of an exemplary testing pattern for silver migration studies of the present disclosure.

A glue dispensing system, Shotmaster™ 300 from Musashi Engineering, was used to print testing patterns (as shown in FIG. 1) on polyethylene terephthalate (PET)

substrates. Testing patterns having a spacing of about 1 mm and about 3.5 mm between conducting tracks were prepared for the present studies. Conducting tracks made from DuPont 5025 silver ink were cured at about 120° C. for about 15 minutes.

Coating with Functionalized Organosiloxane Network

In an exemplary preparation, the 1,14-tetradecanedioic acid solution was dip-coated onto a sample prepared in the previous step, then the sample baked at about 110° C. for about 1 minute. The APTMS solution was then dip-coated onto the sample, then the sample baked at about 110 ° C. for about 1 minute. The foregoing steps were repeated eight times. The 1,14-tetradecanedioic acid solution was then dip-coated onto the sample, then the sample baked at about 110° C. for about 1 minute.

It will be appreciated that the APTMS solution can also be used to form the first layer, then the 1,14-tetradecanedioic acid used to form the second, and these steps repeated until the desired thickness is reached.

It will also be appreciated that there are other methods of coating a conducting member such as a conducting track with a functionalized organosiloxane network. For example, a substrate having a conducting member thereon such as a conducting track can be heated to a temperature suitable for removing water, for example about 110° C. Then, the 1,14-tetradecanedioic acid solution and the APTMS solution can be sprayed on the substrate having the conducting member thereon so that the functionalized organosiloxane network is formed in situ as a coating for the conducting member. The time for forming a functionalized organosiloxane network that at least substantially coats the surface of the conducting member at a temperature of about 110° C. may be less than about a few seconds.

Water Drop Test

The Water Drop test as described by IPC-TM-650 was employed to study the silver migration process in the conductors prepared as described above. For this test, first, a wire was attached to each of two tested conducting tracks. Second, a drop of deionized water was placed across the conducting tracks. Third, a DC bias (~10 V) was supplied to the conducting tracks through the wires, and data recording simultaneously started. Finally, the silver migration process was observed, and the time required for shorts to form was recorded. In the studies of the present disclosure, the change of the resistance between the two neighboring conducting tracks being tested was recorded.

Results

Figure 2:
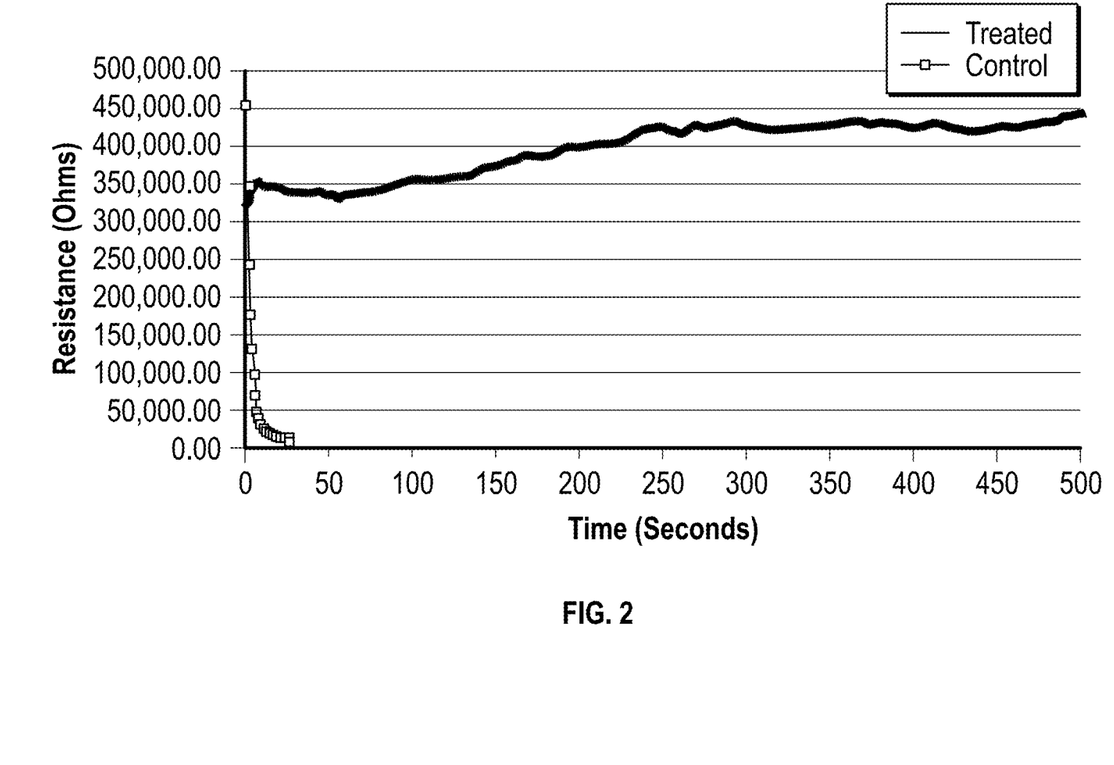
FIG. 2 is a plot showing the change of resistance between two conducting tracks with a gap of 1 mm during a water drop test.
Figure 3:
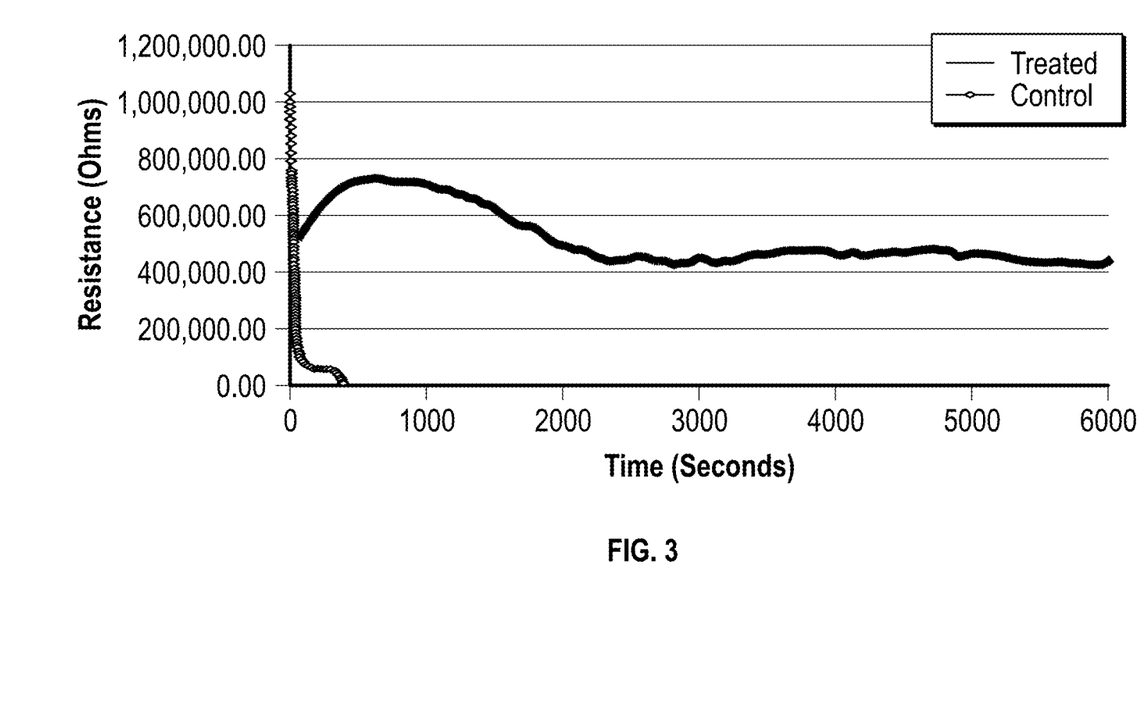
FIG. 3 is a plot showing the change of resistance between two conducting tracks with a gap of 3.5 mm during a water drop test.

It has been found that the functionalized organosiloxane network is very effective in controlling the silver migration in the conductors of the present disclosure. FIG. 2 presents the results for the conductor of the present disclosure having conducting tracks with a gap distance of about 1 mm as compared to a control sample which does not have a functionalized organosiloxane network coating. For the control sample, silver migration causes the short in a few seconds. In contrast, for the conductor of the present disclosure comprising a functionalized organosiloxane network, visual silver migration does not occur in about 500 seconds and the resistance between the conductors was more or less maintained during this testing period. This improvement over the control sample is even more pronounced with the conductor of the present disclosure having conducting tracks having a gap of about 3.5 mm between them as shown in FIG. 3.

The present disclosure has been described with regard to specific examples. The description was intended to help the understanding of the disclosure, rather than to limit its scope. It will be apparent to one skilled in the art that various modifications can be made to the disclosure without departing from the scope of the disclosure as described herein, and such modifications are intended to be covered by the present document.

All publications, patents and patent applications are herein incorporated by reference in their entirety to the same extent as if each individual publication, patent or patent application was specifically and individually indicated to be incorporated by reference in its entirety. Where a term in the present disclosure is found to be defined differently in a document incorporated herein by reference, the definition provided herein is to serve as the definition for the term.

REFERENCES

[1] M. V. Coleman and A. E. Winster, "Silver migration in thick-film conductors and chip attachment resins," J. Microelectronics, Vol. 12, no. 4, pp.23-29, 1981.
[2] J. C. Lin and J. Y. Chan, "On the resistance of silver migration in Ag—Pd conductive thick films under humid environment and applied d.c. field", Materials Chemistry and Physics, Vol. 43, pp. 256-265, 1996.
[3] G. Harsanyi and G. Inzelt, "Comparing migratory resistive short formation abilities of conductor systems applied in advanced interconnection systems", Microelectronics Reliability, Vol. 41, pp. 229-237, 2001.
[4] J. C. Crumpton and R. P. Waldrop, "Method for Preventing or Reducing Silver Migration in The Crossover Areas of a Membrane Touch Switch", U.S. Patent Application Publication No. 2011/0281024.
[5] H. Schonhorn and L. H. Sharpe, "Prevention of Surface Mass Migration by Means of a Polymeric Surface Coating", U.S. Pat. No. 4,377,619.
[6] J. R. Dorfman, "Thick Film Conductor Compositions for Use in Membrane Switch Applications", U.S. Pat. No. 6,939,484.
[7] Y. Li and C. P. Wong, "Monolayer Protection for Electrochemical Migration Control in Silver Nanocomposite", Appl. Phys. Lett., Vol. 89, p. 112112, 2006.
[8] V. Brusic, G. S. Frankel, J. Roldan and R. Saraf, "Corrosion and Protection of a Conductive Silver Paste", J. Electrochemcal Society, Vol. 142, pp. 2591-2594, 1995.

The invention claimed is:

1. A conductor, comprising:
   at least two conducting members comprising silver; and
   a functionalized organosiloxane network coating the at least two conducting members, the functionalized organosiloxane network comprising units of the formula:

wherein
   Y is chosen from $C_{1-10}$alkylene, $C_{2-10}$alkenylene, $C_{2-10}$alkynylene, $C_{6-14}$arylene and —$C_{1-6}$alkylene-$C_{6-14}$arylene-$C_{1-6}$alkylene—;
   each $R^{4a}$ is independently H or —C(O)-A-X;

each $R^{4b}$ is independently chosen from H, $C_{1-6}$alkyl, $C_{2-6}$alkenyl, $C_{2-6}$alkynyl and $C_{6-10}$aryl or is —C(O)-A-X;

A is absent or is chosen from $C_{1-20}$alkylene, $C_{2-20}$alkenylene, $C_{2-20}$alkynylene, $C_{6-14}$arylene and —$C_{1-10}$alkylene-$C_{6-14}$arylene-$C_{1-10}$alkylene-; and

X is chosen from a carboxylic acid, a thiol and a sulfonate, provided that at least one of $R^{4a}$ and $R^{4b}$ is —C(O)-A-X; and wherein the functionalized organosiloxane network at least substantially inhibits dendrite formation between a first conducting member and a second conducting member.

2. The conductor of claim 1, wherein X is a carboxylic acid.

3. The conductor of claim 1, wherein the at least two conducting members further comprise a polymeric binder.

4. A conductor, comprising:
at least two conducting members comprising silver; and
a functionalized organosiloxane network coating the at least two conducting members, the functionalized organosiloxane network being obtained by reacting at least one organosiloxane network precursor of Formula (I) or at least one organosiloxane network prepared by the condensation of at least one organosiloxane network precursor of Formula (I):

(I)

wherein
$R^1$, $R^2$ and $R^3$ are each independently chosen from hydroxy and a group that is hydrolysable under conditions to form a hydroxylated organosilane; and
$L^1$ has the formula:

wherein
Y is chosen from $C_{1-10}$alkylene, $C_{2-10}$alkenylene, $C_{2-10}$alkynylene, $C_{6-14}$arylene and —$C_{1-6}$alkylene-$C_{6-14}$arylene-$C_{1-6}$alkylene; and
$R^4$ is chosen from H, $C_{1-6}$alkyl, $C_{2-6}$alkenyl, $C_{2-6}$alkynyl and $C_{6-10}$aryl, with at least one functionalization precursor of Formula (II):

$L^2$—X (II), wherein
X is chosen from a carboxylic acid, a thiol and a sulfonate; and $L^2$ has the formula:

wherein A is absent or is chosen from $C_{1-20}$alkylene, $C_{2-20}$alkenylene, $C_{2-20}$alkynylene, $C_{6-14}$arylene and $C_{1-10}$alkylene-$C_{6-14}$arylene- $C_{1-10}$alkylene—,
under conditions to form the functionalized organosiloxane network; and
wherein the functionalized organosiloxane network at least substantially inhibits dendrite formation between a first conducting member and a second conducting member.

5. The conductor of claim 1, wherein the at least two conducting members are tracks.

6. The conductor of claim 1, wherein the conductor is in a printed electronic circuit.

7. The conductor of claim 1, wherein the at least two conducting members are tracks.

8. The conductor of claim 4, wherein the conductor is in a printed electronic circuit.

9. The conductor of claim 1, wherein Y is $C_{1-10}$alkylene.

10. The conductor of claim 1, wherein A is $C_{1-20}$alkylene.

11. The conductor of claim 1, wherein Y is —$(CH_2)_3$—, and A is —$(CH_2)_{12}$—.

12. The conductor of claim 1, wherein each $R^{4b}$ is independently chosen from H or —C(O)-A-X.

13. The conductor of claim 1, wherein Y is —$(CH_2)_3$—, A is —$(CH_2)_{12}$—, X is a carboxylic acid, and each $R^{4b}$ is independently chosen from H or —C(O)-A-X.

14. The conductor of claim 4, wherein Y is $C_{1-10}$alkylene.

15. The conductor of claim 4, wherein A is $C_{1-20}$alkylene.

16. The conductor of claim 4, wherein the organosiloxane network precursor is (3-aminopropyl)trimethoxysilane and the functionalization precursor is 1,14-tetradecanedioic acid.

17. The conductor of claim 4, wherein $R^4$ is H.

18. The conductor of claim 4, wherein $R^1$, $R^2$ and $R^3$ are all —$OCH_3$.

19. The conductor of claim 4, wherein the functionalized organosiloxane network is prepared by a method comprising:
coating the at least two conducting members with a solution comprising the compound of Formula (II) and a solvent;
optionally heating for a time and at a temperature to at least substantially remove the solvent;
reacting the compound of Formula (II) with a solution comprising the compound of Formula (I); and
heating for a time and at a temperature to obtain the functionalized organosiloxane network.

20. The conductor of claim 19, wherein the method is repeated until a functionalized organosiloxane network having a desired thickness is obtained.

* * * * *